United States Patent Office 3,183,223
Patented May 11, 1965

3,183,223
METAL-CONTAINING POLYAZO DYESTUFFS
Karl-Heinz Schündehütte, Leverkusen, Horst Nickel, Cologne-Stammheim, Karl-Heinz Schmidt, Cologne-Flittard, and Fritz Suckfüll, Leverkusen, Germany, assignors to Farbenfabriken Bayer Aktiengesellschaft, Leverkusen, Germany, a German corporation
No Drawing. Filed Mar. 11, 1960, Ser. No. 14,204
Claims priority, application Germany, Mar. 13, 1959, F 27,947
8 Claims. (Cl. 260—145)

The invention relates to new and valuable metal-containing polyazo dyestuffs; more particularly it relates to copper, nickel or chromium complexes of polyazo dyestuffs of the formula

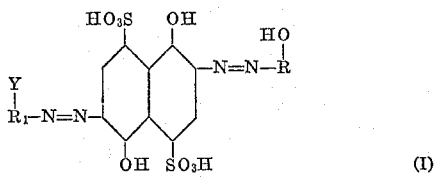

(I)

In this formula R represents the residue of a naphthalene, azo naphthalene or pyrazolone coupling component bearing the OH group in o-position to —N=N, $R_1$ stands for the residue of a diazo compound which may contain further azo groups, having Y in adjacent position to —N=N—, and Y means OH or COOH.

The new dyestuffs are obtainable by coupling a copper complex having the formula

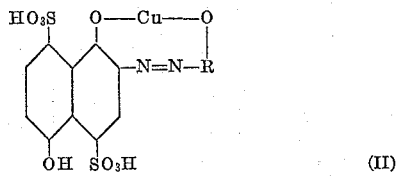

(II)

wherein R has the above significance, with a diazo component

(III)

wherein $R_1$ represents the residue of a diazo compound containing $Y_1$ in the o-position to the diazonium group, and $Y_1$ represents a metal complex-forming group or a group which may be converted into a metal complex-forming substituent under the conditions of metallization, carrying out conversion reactions customary for azo dyestuffs, if desired, with substituents in the radicals R and $R_1$, for instance transforming amino or nitro groups into further azo groups, and treating the dyestuffs thus obtained with metal-yielding agents in substance or on a substrate.

In the general Formula I the radicals R and $R_1$ may contain the usual substituents of azo dyestuffs such as alkyl, alkoxy, amino, halogeno, nitro, acylamino, sulfonic acid, carboxylic acid and/or azo groups or even condensed heterocyclic ring system, for example the grouping

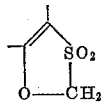

In some cases it is advantageous to introduce these groupings into the radicals R and $R_1$ by conventional conversion reactions during various steps of the production process of the new dyestuffs. Among the conventional conversion reactions there are to be understood, for example the diazotisation of amino groups and further coupling with azo groups, or the conversion in the presence of a second amino group-containing component, with polyfunctional acylating agents such as phosgene, cyanuric acid chloride, fumaric acid dichloride or terephthalic acid dichloride and so on. Amino groups can likewise be converted into their derivatives with monofunctional acylating agents such as aliphatic or aromatic acid chlorides, for example acetyl chloride, benzoyl chloride or chloroformic acid ester. Nitro groups may be transformed with the formation of azo or azoxy groups by reductive linkage with the same or different nitro group-containing components. Some of the conversion products, for example in the case of a urethane or a conversion product of amines with polyfunctional acylating agents, can be further converted.

The various conversion products obtained by the aforementioned reactions may be present in the radical R from the outset. They may also be introduced into this radical or into the radical $R_1$ after the coupling with the diazo component

or even following a metallisation of the dyestuffs in substance.

As metal complex-forming group Y and $Y_1$ there are preferred phenolic or enolic hydroxyl groups, and carboxylic groups, or groupings such as halogen or alkoxy substituents, which may be exchanged for the hydroxyl group under the conditions of metallisation, especially coppering.

As groupings which may be transformed into metal complex-forming groups under the conditions of metallisation there may be mentioned especially the hydrogen atom and the $SO_3H$— group which are exchanged for metal complex-bound hydroxyl groups by the processes of oxidising coppering. Suitable metal complex-forming groups are moreover those belonging to a heterocyclic ring, for example the heterocyclically bound NH— grouping.

As an example of a simple azo component of the Formula II is the copper complex of the formula

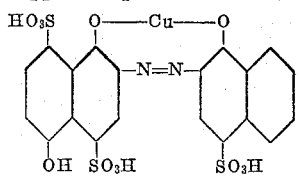

An azo component of a similar structure having a substituent in the radical R which may be subjected to secondary conversion reactions of the aforesaid kind is the copper complex monoazo dyestuff

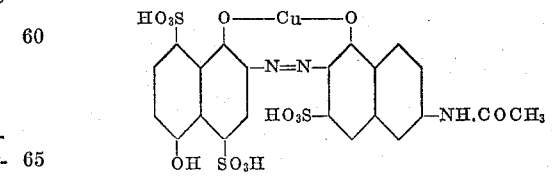

In a compound of this type, after coupling with the component (III) and forming the metal complex, the acylamino group may be saponified and the amino group converted by secondary reactions with polyfunctional acylating agents such as phosgene or chloroformic acid esters to give the corresponding derivatives.

As an example of a compound containing an azo group in the radical R there may be mentioned the copper complex disazo dyestuff of the formula

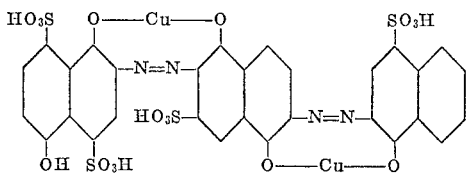

The copper complex of the monoazo compound of the Formula II may be prepared in accordance with copending U.S. application S.N. 14,206 by Schündehütte et al., filed on March 11, 1960, and assigned to the same assignee, now abandoned, for example by coupling diazotized 2-amino-5-acylhydroxy-naphthalene-4,8-disulfonic acid or 2-amino-5,4-naphthosulfone-8-sulfonic acid with an azo component

of the defined class in the o-position to the OH— group, oxidizing coppering the dyestuff thus obtained and splitting the sulfone group or saponifying the 5-positioned -acyl group in an alkaline medium.

The coupling of the starting compound (II) with the diazo component (III) is carried out, in general in an alkaline medium, if desired, in pyridine. Examples of amino compounds on which the diazo component is based are e.g. 1-aminobenzene-2-carboxylic acid, 1-amino-2-chlorobenzene-4-sulfonic acid, 1-amino-2-methoxybenzene-5-sulfonic acid, 1-bromo-2-aminonaphthalene-6-sulfonic acid, 4-aminobenztriazole, 2-amino-1-chloro-5-benzene-sulfonyl-hydroxynaphthalene-7-sulfonic acid, or the monoazo dyestuff obtained by coupling diazotised 1-aminobenzene-4-sulfonic acid with 1-amino-2-methoxy-5-methylbenzene.

As the amine

there may also be used polyfunctional amino compounds such as dianisidine or 4,4'-diamino-1,1'-azobenzene-3,3'-dicarboxylic acid, enabling the production of both symmetric and asymmetric dyestuffs.

The formation of the metal complex may be carried out by known methods. The direct action of cupric salts, the reaction with Fehling solution or oxidising coppering are suitable for the production of copper complexes, for example. After decoppering, the dyestuffs may be converted in substance, by the action of other metal-yielding agents, into other metal complex compounds, for example nickel complexes, or metallised on the fibre by the action of metal-yielding, especially copper- or chromium-yielding, agents.

The new dyestuffs are especially suitable for the dyeing of vegetable fibres. The dyeings are distinguished by good fastness properties.

The following examples are given for the purpose of illustrating the invention.

*Example 1*

24.4 parts by weight of 4,4'-diamino-3,3'-dimethoxy-1,1'-diphenyl are stirred in 150 parts by volume of water and 56 parts by volume of hydrochloric acid (d. 1.14). 140 parts by volume of a 10% sodium nitrite solution are added at 0–5° C. Upon completion of tetrazotising, this solution is added at 0–5° C. to a solution of 142.4 parts by weight of the copper complex compound of the monoazo dyestuff of the formula

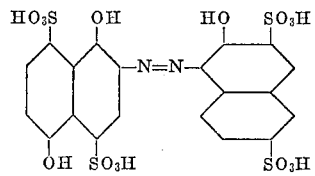

in 1000 parts by volume of water, and 100 parts by volume of ammonia and 500 parts by volume of pyridine are then added. Upon completion of coupling, the dyestuff is isolated and converted into the copper complex by the methods of demethylating coppering.

The dry dyestuff is a dark powder which dissolves in water with a blue colour and dyes cotton in greenish grey shades.

The copper complex of the above formula may be obtained according to Example 1 of copending U.S. application S.N. 14,206 by Schündehütte et al., filed March 11, 1960, and assigned to the same assignee, now abandoned, as follows:

30.1 parts by weight (0.1 mol) of 2-amino-5,4-naphthosultone-8-sulfonic acid are dissolved neutral in 800 parts by volume of ice water; 70 parts by volume of a 10% sodium nitrite solution are added and subsequently 30 parts by volume of hydrochloric acid (d. 1.14) are rapidly poured into the solution. The mixture is stirred at 0–5° C. for about 30 minutes. When the diazotisation is completed, the mixture is combined at 0–5° C. with a solution of 30.4 parts by weight (0.1 mol) of 2-hydroxynaphthalene-3,6-disulfonic acid in 350 parts by volume of water and then treated with 40 parts by weight of sodium bicarbonate. After completion of coupling, the monazo dyestuff thus formed is isolated by the addition of common salt.

The paste thus obtained is dissolved in about 1700 parts by volume of water and treated with 140 parts by volume of a 20% sodium acetate solution and a solution of 25 parts by weight of crystalline copper sulphate in 120 parts by volume of water. About 250 parts by volume of 3% hydrogen peroxide are then added at 20° C. within 90 minutes until oxidizing coppering is completed. The copper complex of the monoazo dyestuff is separated with sodium chloride and isolated.

The paste is stirred in 500 parts by volume of water, treated with 50 parts by volume of a sodium hydroxide solution (40%) and stirred at 40–50° C. for about 30 minutes. The solution is brought to a pH of 8 with acetic acid, and the dyestuff separated with sodium chloride and isolated. The resultant copper complex of the dyestuff of the formula

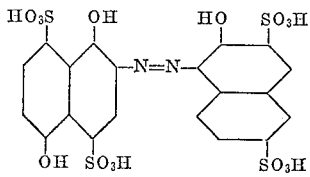

represents, after drying, a dark powder which dissolves in water with a blue-violet colouration. After the addition of a sodium hydroxide solution, the shade changes to a blue-green.

*Example 2*

The tetrazo compound from 24.4 parts by weight of 4,4'-diamino-3,3'-dimethoxy-1,1'-diphenyl is coupled in soda-alkaline medium with 30.4 parts by weight of 1-hydroxynaphthalene-3,6-disulfonic acid to give the diazo-azo dyestuff which is subsequently isolated.

The dyestuff paste thus obtained is added to a solution of 63.2 parts by weight of the copper complex compound of the monoazo dyestuff having the formula

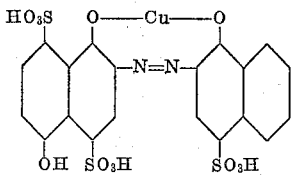

in 500 parts by volume of water, 250 parts by volume of pyridine and 50 parts by weight of ammonia. Upon completion of coupling, the trisazo dyestuff is isolated and coppered by conventional demethylating methods. The dry dyestuff is a dark powder which dissolves in water with a blue colour and dyes cotton in blue-grey shades.

When replacing 1-hydroxynaphthalene - 3,6 - disulfonic acid, for instance by 1-hydroxynaphthalene-3,8-disulfonic acid, 1-hydroxynaphthalene - 3,6,8 - trisulfonic acid, 1-hydroxynaphthalene-4,8-disulfonic acid, 1,8-dihydroxynaphthalene - 3,6 - disulfonic acid, 1 - hydroxynaphthalene - 4 - sulfonic acid, 2-benzoylamino - 5 - hydroxynaphthalene-7-sulfonic acid, 2-phenylamino - 5 - hydroxynaphthalene - 7 - sulfonic acid, 1-benzoylamino-8-hydroxynaphthalene-3,6-disulfonic acid, 2-hydroxynaphthalene-3,6-disulfonic acid, 2-hydroxynaphthalene-4-sulfonic acid or 2-hydroxynaphthalene-6-sulfonic acid, dyestuffs of similar shades and fastness properties are obtained.

*Example 3*

32.1 parts by weight of 4-amino-5-methoxy-2-methyl-azobenzene - 4' - sulphonic acid are diazotised by conventional methods and added to a solution of 71.2 parts by weight of the copper complex having the formula

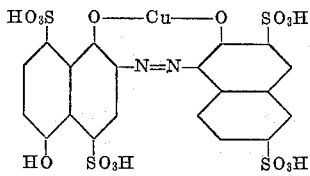

and 28 parts by weight of sodium carbonate dissolved in 1000 parts by weight of water. Upon completion of coupling, the dyestuff is separated with sodium chloride and isolated. By conversion into the copper complex according to the methods of demethylating coppering, a dyestuff is obtained which in the dry state represents a dark powder which dissolves in water with a blue colour and dyes cotton in greenish grey shades.

*Example 4*

18 parts by weight of 1-amino-4-acetylaminobenzene-2-carboxylic acid are diazotised in usual manner and added to a solution of 71.2 parts by weight of the copper complex having the formula

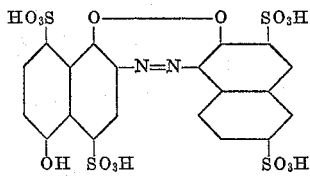

dissolved in 1000 parts by volume of water, and treated with 30 parts by weight of sodium bicarbonate and 200 parts by volume of pyridine. After completion of coupling, the dyestuff is isolated, the dyestuff paste obtained dissolved in 750 parts by volume of water, 100 parts by volume of a sodium hydroxide solution (40%) are added and the mixture heated to about 80° C. until the saponification is completed. After isolation the paste of the aminoazo dyestuff is dissolved in 750 parts by volume of water at about 30° C. and converted at pH 9-10 by treatment with phosgene into the urea which is separated with sodium chloride, isolated and subsequently transformed into the copper complex dyestuff of the following formula

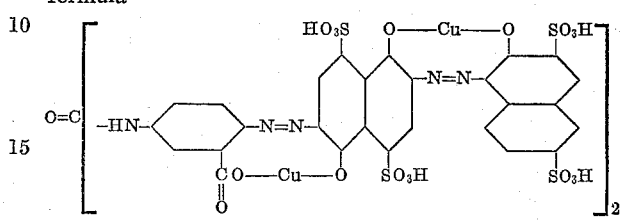

The dry dyestuff is a dark powder which dissolves in water with a green colour and dyes cotton in green shades.

*Example 5*

18 parts by weight of 1-amino-4-acetylaminobenzene-2-carboxylic acid are diazotised in conventional manner and added to a solution of 66.2 parts by weight of the copper complex having the formula

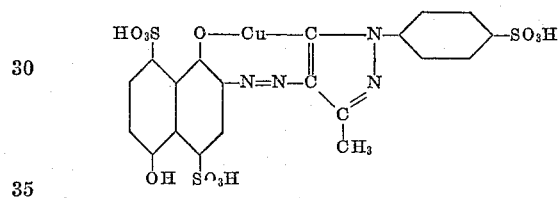

dissolved in 1000 parts by volume of water, and treated with 30 parts by weight of sodium bicarbonate and 200 parts by volume of pyridine. After completion of coupling, the dyestuff is isolated, the dyestuff paste dissolved in 750 parts by volume of water, 100 parts by volume of a sodium hydroxide solution (40%) are added and the mixture heated to about 80° C. until the saponification is completed. After isolation, the paste of the aminoazo dyestuff is dissolved in 750 parts by volume of water at about 30° C. and converted at pH 9-10 by treatment with phosgene into the urea which is separated by addition of sodium chloride, isolated and subsequently transformed into the copper complex dyestuff of the formula

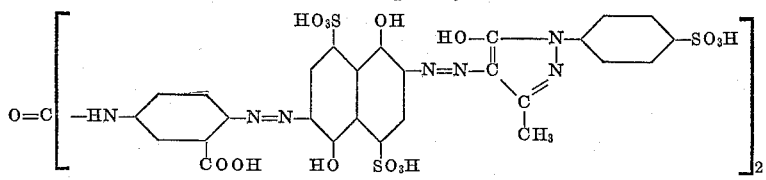

The dry dyestuff represents a dark powder which dissolves in water with a green colour and dyes cotton in green shades.

The same dyestuff can be obtained by coupling the tetrazo compound of the 4,4'-diamino-diphenyl urea-3,3'-dicarboxylic acid with the copper complex compound of the formula given in this example in the first place.

The complete coppering of the dyestuffs may be effected on the fibre or in substance.

*Example 6*

72.7 parts by weight of the copper complex having the formula

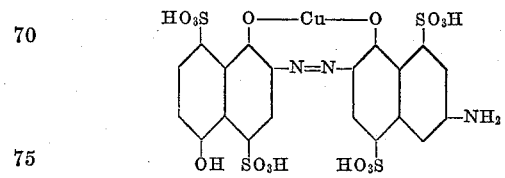

are dissolved in 750 parts by volume of water at about 30° C. and converted at a pH 8–10 into the urea by treatment with phosgene. After isolation the dyestuff paste is dissolved in 1000 parts by volume of water, treated with 30 parts by weight of sodium bicarbonate and 300 parts by volume of pyridine. The diazo compound of 13.7 parts by weight of 2-aminobenzoic acid is then added to the mixture. Upon completion of coupling, the dyestuff is isolated and converted in conventional manner into the copper complex which, after drying, is a dark powder dissolving in water with a blue colour and dyeing cotton in greenish grey shades.

*Example 7*

67.7 parts by weight of the copper complex having the formula

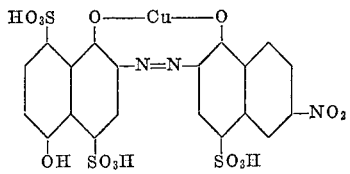

and 30 parts by weight of sodium carbonate are dissolved in 1000 parts by volume of water and treated with the diazo compound of 13.7 parts by weight of 2-aminobenzoic acid.

After the coupling is completed, the dyestuff is isolated, the paste dissolved in 750 parts by volume of water and 100 parts of a sodium hydroxide solution (40%) and reductively combined by the addition of 17 parts by weight of glucose at 50–60° C. to form the azo or azoxy dyestuff. After conversion into the copper complex the dry dyestuff represents a dark powder which dissolves in water with a blue-green color and dyes cotton in greenish gray shades.

*Example 8*

67.2 parts by weight of the copper complex having the formula

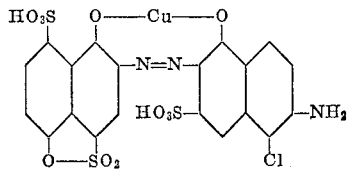

are dissolved in 1500 parts by volume of water, treated with 70 parts by volume of a 10% sodium nitrite solution and then with 60 parts by volume of glacial acetic acid. After the diazotisation is completed, the reaction solution is run into a solution of 30.4 parts by weight of 2-hydroxynaphthalene-3,6-disulphonic acid and 45 parts by weight of sodium carbonate dissolved in 350 parts by volume of water. After the coupling is completed, the dyestuff is separated with sodium chloride and isolated.

The dyestuff paste thus obtained is dissolved in 500 parts by volume of water and 50 parts by volume of a sodium hydroxide solution (40%), heated to 80° C. for about 30 minutes and subsequently isolated at pH 5 after the addition of sodium chloride. The paste is dissolved in 500 parts by volume of water and 30 parts by weight of sodium carbonate, combined with the diazo compound of 18 parts by weight of 1-amino-4-acetylaminobenzene-2-carboxylic acid and then treated with 50 parts by volume of pyridine. After completion of the coupling, the dyestuff which in the free acid state corresponds to the formula

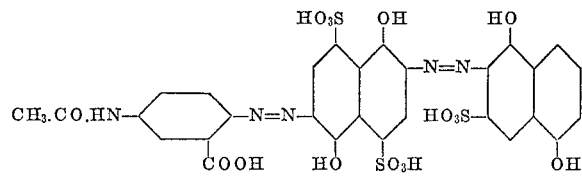

is separated, isolated and converted by usual methods into the copper complex; in the dry state it represents a dark powder which dissolves in water with a blue colour and dyes cotton in greenish grey shades.

*Example 9*

The tetrazo compound from 24.4 parts by weight of 4,4'-diamino-3,3'-dimethoxy-1,1'-diphenyl is coupled in soda alkaline medium with a solution of 63.2 parts by weight of the copper complex compound having the formula

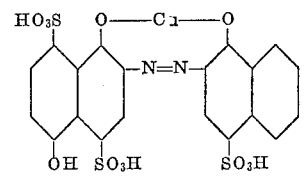

The precipitated diazoazo compound is isolated and combined with a solution of 25.4 parts by weight of 1-(4'-sulfophenyl)-3-methylpyrazolone-(5) and 30 parts by weight of sodium carbonate in 500 parts by volume of water. After coupling is complete, the dyestuff is isolated and converted into the copper complex according to the methods of demethylating coppering. In the dry state the dyestuff is a dark powder which dissolves in water with a blue color and dyes cotton in grey shades. When replacing 1-(4'-sulfophenyl)-3-methylpyrazolone-(5) for instance by 1-(2'-methyl-4'-sulfophenyl)-3-methylpyrazolone-(5), 1-(3'-sulfophenyl)-3-methylpyrazoleimide-(5), 1-(4'-sulfophenyl)-pyrazolone-(5)-carboxylic acid-(3), barbituric acid or 1-hydroxy-4-methylbenzene, dyestuffs are obtained which dye cotton in grey shades.

We claim:

1. The copper complex of a polyazo dyestuff of the formula

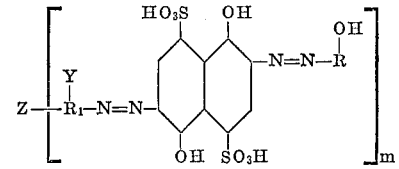

wherein R represents a member selected from the group consisting of naphthalene, azo-naphthalene and pyrazolone coupling component, said member carrying the OH group in adjacent position to the azo bridge, and at least one —SO₃H group on the coupling component; $R_1$ stands for a member selected from the class consisting of a benzene, benzene-azo-benzene and naphthalene-azo-diphenyl diazo component when $m$ stands for the integer 1, and a diazo component of the benzene series when $m$ stands for the integer 2; Z is a hydrogen when $m$ is 1, and a member taken from the class consisting of a direct linkage and —NHCOHN— when $m$ is 2; $R_1$ carrying the metal complex-forming group Y, in ortho-position to the —N=N— bridge.

2. The copper complex dyestuff of claim 1 wherein $R_1$ stands for a diazo component of the benzene series; $m$ is the integer 2; Z means a direct linkage; Y stands for —OCH₃; and R means a coupling component of the naphthalene series.

3. The copper complex dyestuff of claim 2 wherein $R_1$ stands for a member of the naphthalene-azo-diphenyl series; Z is hydrogen; $m$ stands for the integer 1; and R stands for a monosulfo naphthalene.

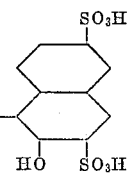

4. The copper complex dyestuff of claim 2 wherein

stands for

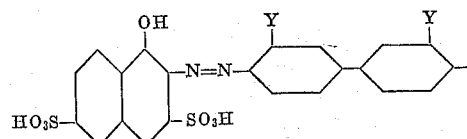

$m$ stands for 1; and R stands for a mono-sulfo naphthalene.

5. The copper complex dyestuff having the formula

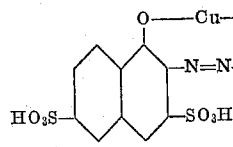

6. The copper complex dyestuff having the formula

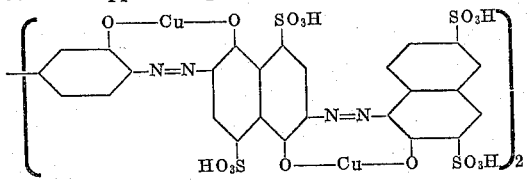

7. The copper complex dyestuff having the formula

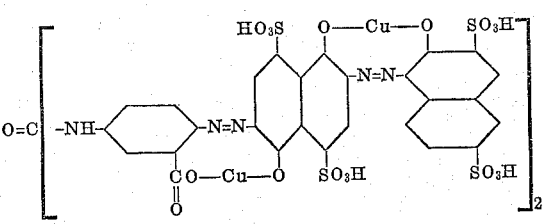

8. The copper complex dyestuff having the formula

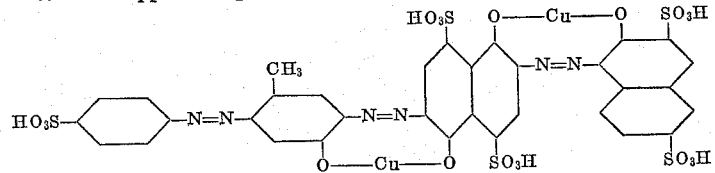

References Cited in the file of this patent
UNITED STATES PATENTS 2,887,476 Nickel et al. _____ May 19, 1959
2,892,827 Nickel et al. _____ June 30, 1959
2,919,269 Nickel et al. _____ Dec. 29, 1959